United States Patent
Schleifer et al.

(10) Patent No.: US 11,740,183 B2
(45) Date of Patent: Aug. 29, 2023

(54) ACCURATE RAMAN SPECTROSCOPY

(71) Applicant: NOVA LTD., Rehovot (IL)

(72) Inventors: Elad Schleifer, Rehovot (IL); Yonatan Oren, Rehovot (IL); Amir Shayari, Rehovot (IL); Eyal Hollander, Ramat Hasharon (IL); Valery Deich, Rehovot (IL); Shimon Yalov, Rehovot (IL); Gilad Barak, Rehovot (IL)

(73) Assignee: Nova Ltd., Rehovot (IL)

( * ) Notice: Subject to any disclaimer, the term of this patent is extended or adjusted under 35 U.S.C. 154(b) by 0 days.

(21) Appl. No.: 17/759,031

(22) PCT Filed: Nov. 24, 2020

(86) PCT No.: PCT/IB2020/061066
§ 371 (c)(1),
(2) Date: Jul. 18, 2022

(87) PCT Pub. No.: WO2021/144634
PCT Pub. Date: Jul. 22, 2021

(65) Prior Publication Data
US 2023/0044886 A1    Feb. 9, 2023

Related U.S. Application Data

(60) Provisional application No. 62/961,721, filed on Jan. 16, 2020.

(51) Int. Cl.
 *G01J 3/44*   (2006.01)
 *G01N 21/65*  (2006.01)
 *G01J 3/02*   (2006.01)

(52) U.S. Cl.
 CPC ............ *G01N 21/65* (2013.01); *G01J 3/0205* (2013.01); *G01J 3/027* (2013.01); *G01J 3/4412* (2013.01);
(Continued)

(58) Field of Classification Search
 CPC ............... G01N 21/65; G01N 21/64; G01N 2201/06113; G01N 2201/0636;
(Continued)

(56) References Cited

U.S. PATENT DOCUMENTS 4,957,367 A * 9/1990 Dulman ........... G01N 21/95607
                                                356/512
5,713,364 A * 2/1998 DeBaryshe ........ G01N 21/4795
                                                600/407

(Continued)

*Primary Examiner* — Abdullahi Nur
(74) *Attorney, Agent, or Firm* — Reches Patents

(57) ABSTRACT

A method, a system, and a non-transitory computer readable medium for accurate Raman spectroscopy. The method may include executing at least one iteration of the steps of: (i) performing, by an optical measurement system, a calibration process that comprises (a) finding a misalignment between a region of interest defined by a spatial filter, and an impinging beam of radiation that is emitted from an illuminated area of a sample, the impinging beam impinges on the spatial filter; and (b) determining a compensating path of propagation of the impinging beam that compensates the misalignment; and (ii) performing a measurement process, while the optical measurement system is configured to provide the compensating path of propagation of the impinging beam, to provide one or more Raman spectra.

30 Claims, 14 Drawing Sheets

(52) U.S. Cl.
CPC ........... *G01N 2201/0636* (2013.01); *G01N 2201/06113* (2013.01)

(58) Field of Classification Search
CPC ........ G01J 3/0205; G01J 3/027; G01J 3/4412; G01J 3/44; G01J 3/28; G01J 3/02; G01J 3/0286; A61B 5/0075
See application file for complete search history.

(56) References Cited

U.S. PATENT DOCUMENTS

| | | | |
|---|---|---|---|
| 11,092,494 B1* | 8/2021 | Carron | G01J 3/0237 |
| 2002/0105640 A1* | 8/2002 | Deck | G02B 21/18 |
| | | | 356/301 |
| 2004/0090621 A1* | 5/2004 | Bennett | G01J 3/02 |
| | | | 250/311 |
| 2015/0185076 A1 | 7/2015 | Zhao et al. | |
| 2017/0276610 A1 | 9/2017 | Fujita et al. | |
| 2018/0372644 A1 | 12/2018 | Barak et al. | |
| 2020/0278250 A1 | 9/2020 | Scarcelli et al. | |

* cited by examiner

291

292

293

294

295

296

297

298

299

ACCURATE RAMAN SPECTROSCOPY

CROSS REFERENCE

This application claims priority from U.S. provisional patent Ser. No. 62/961,721 filing date 16 Jan. 2020, which is incorporated herein in its entirety.

BACKGROUND

Raman Spectroscopy is an established technology, with extensive literature describing its usage for the characterization of various material properties.

The Raman spectrum carries information on various properties of a sample. Most notably, different peaks in the spectrum correspond to different materials. When the measured target is comprised of material compounds (e.g. SiGe), specific peaks in the Raman spectrum would correspond to different atom pairs (e.g. Si—Si, Si—Ge and Ge—Ge).

Methods for extracting information on concentration and stress from the positions of these peaks are well known in the literature. For example, a set of equations relating the positions of the three SiGe peaks with the Germanium composition and the layer stress, is presented in the following publication: T. S. Perov et al., Composition and strain in thin Sii—xGex virtual substrates measured by micro-Raman spectroscopy and x-ray diffraction, J. App. Phys. 109, 033502 (2011).

Doping is another characteristic which affects the Raman spectrum. Carrier concentration, arising from the dopant distribution, affects the Raman signal and causes an additional shift in the Raman peaks. The level of doping can hence be incorporated into the fitting procedure, and concurrent assessment of doping level along with stress and composition is possible through monitoring peak locations (see for example—A. Perez-Rodriguez et al., Effect of stress and composition on the Raman spectra of etch-stop SiGeB layers, J. Appl. Phys. 80, 15 (1996).

Examples of state of the art systems that generate Raman spectrums are provided in PCT patent applications publication serial numbers WO2017/103934 of Barak et el. and WO2017/103935 of Barak et al., both applications are incorporated herein by reference.

The Raman spectrum is very weak and due to this weakness as many Raman spectrum conveying radiation had to be collected.

SUMMARY

There may be provided a system, a method and a non-transitory computer readable medium that stores instructions for accurate Raman spectroscopy.

BRIEF DESCRIPTION OF THE DRAWINGS

In order to understand the invention and to see how it may be carried out in practice, a preferred embodiment will now be described, by way of non-limiting example only, with reference to the accompanying drawings.

DETAILED DESCRIPTION OF THE DRAWINGS

Figure 1:
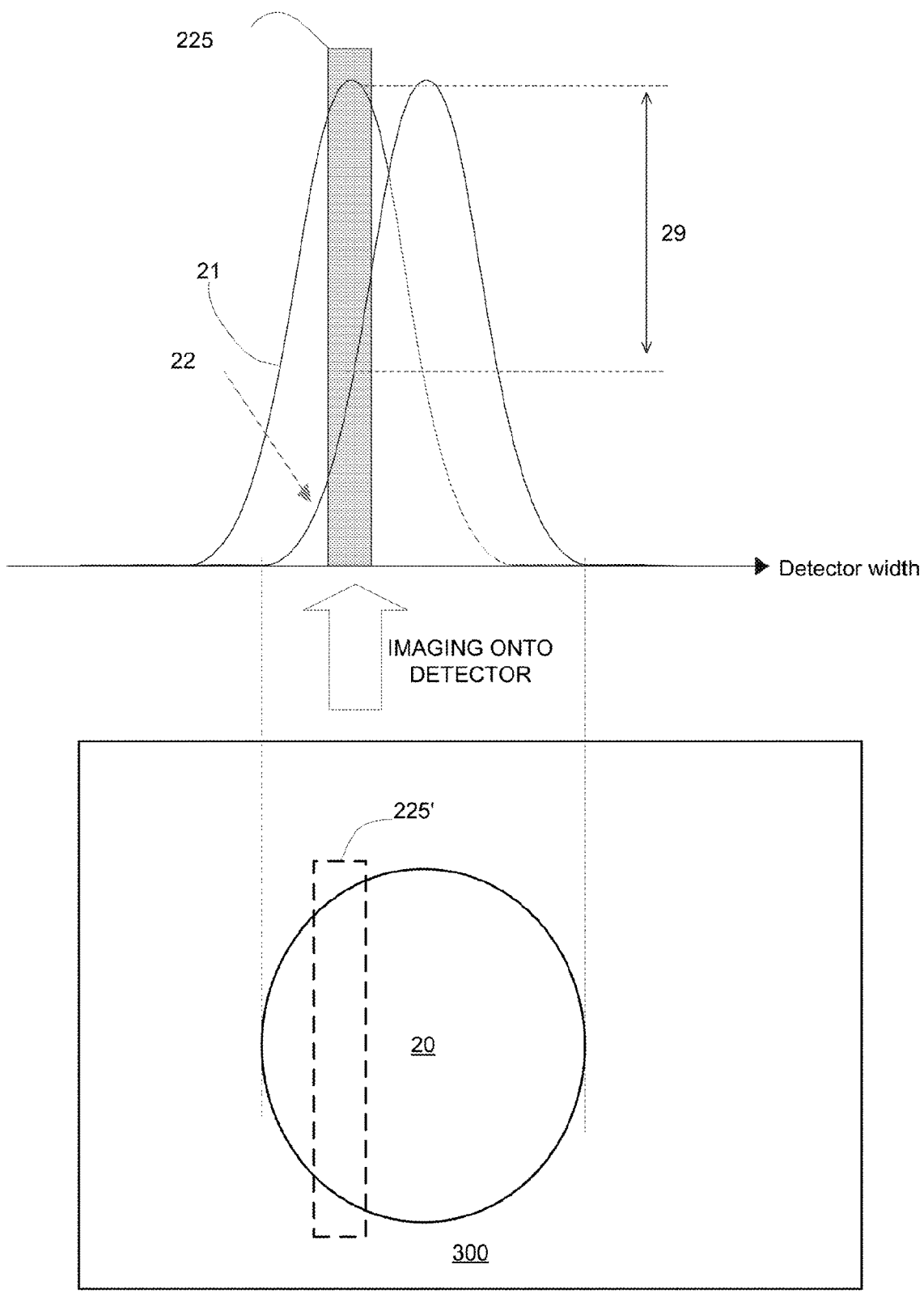
FIG. 1 illustrates an example of an illumination spot, an intensity distribution of an aligned impinging beam, an intensity distribution of a misaligned impinging beam, and a region of interest.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to either one of a system, a method and a non-transitory computer readable medium should be applied mutatis mutandis to any other of the system, a method and a non-transitory computer readable medium. For example—any reference to a system should be applied mutatis mutandis to a method that can be executed by the system and to a non-transitory computer readable medium that may stores instructions executable by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any number, or value illustrated below should be regarded as a non-limiting example.

It has been found that when the sample includes structural elements, the illumination of some of the structural elements (especially irregular (non-periodic, edge-like, etc. structural elements) with radiation may cause the structural element to diffract the radiation, and the diffracted radiation in turn may generate "parasitic" Raman scattering radiation that "distorts" the Raman spectrum (once sensed by a detector of a Raman spectrometer). The "parasitic" Raman scattering radiation may, for example, change the location and shape of one or more Raman spectrum peaks, and the like.

An analysis of a distorted Raman spectrum may result in inaccurate conclusions regarding the material of the sample, the strain of the sample, and inaccuracies related to other properties of the sample.

There is a growing need to improve the accuracy of Raman spectroscopy—and especially a need to reduce the distortions of the Raman Spectrum for purposes of Semiconductor manufacturing process control The Raman spectroscopy may be used in semiconductor wafer manufacturing APC, measuring on patterned structures of the wafer, in-die measurement, and the like.

There may be provided a system, a method, and a non-transitory computer readable medium that stores instructions for accurate Raman spectroscopy.

The impinging beam is emitted from an illuminated area of a sample and impinges on the spatial filter. The illuminated area is illuminated by an illuminating beam of radiation (hereinafter "illuminating beam").

The accuracy of the Raman spectroscopy is increased by preventing undesired scattered radiation from the sample from reaching a detector This may be done by providing a spatial filter for blocking one or more parts of an impinging beam of radiation (hereinafter "impinging beam") that falls outside a region of interest (the region of interest is defined by the spatial filter)—thereby preventing these one or more parts of the impinging beam from reaching the detector.

The spatial filtering may be required when the illumination spot "covers" an irregular area. An irregular area may distort the illumination spot and/or may generate new scattering sources of a Raman spectrum, and/or may include a non-periodic arrangement of elements, and/or may include a non-homogeneous arrangement of elements. Non-limiting examples of irregular areas may include (a) a spot that covers an edge region of a conductor and a vicinity of the edge region—where the edge region is of the same order (for example between 0.1 and 0.9) of the area of the spot, (b) a spot that covers an edge region of a single conductor and also covers the edge region—where the vicinity includes a silt.

The spatial filter may be applied during measurement on the structures including elements such as through silicon vias (TSVs), shallow trench isolation (STI) (e.g. fill, or/and gate oxide), three dimensional NAND memory (3D-NAND) (e.g. strain profiling, crystallinity and dimension profiling), and the like.

The spatial filter may include an adjustable spatial filter that may define different regions of interest. Additionally or alternatively, the spatial filter may exhibit a controllable transparency and/or may define a transparent region of interest that is surrounded by opaque regions. The adjustable filter may be replaced by a set of spatial filters that differ from each other by their spatial filtering properties.

The spatial filter may include fixed elements that define a fixed region of interest.

The spatial filter may be utilized in some modes of operation of the system, and may be removed or unutilized in other modes of operation of the system.

The region of interest may be smaller (and even much smaller) than a relevant cross section of the impinging beam. The relevant cross section of the impinging beam is the cross section formed at the plane of the spatial filter.

For example—the region of interest may be a fraction of the relevant cross section of the impinging beam. For example—the region of interest may be less than 1%, 2%, 5%, 10%, 15%, 20% or 30% of the relevant cross section of the impinging beam.

The illuminated area and the relevant cross section of the impinging beam may be of a same size, may be of a same shape, may differ from each other by size, and/or may differ from each other by shapes.

Non-limiting examples of these shapes are a rectangular spot, an elliptic spot, a circular spot, a line of illumination, and the like.

The region of interest may be defined to prevent scattered radiation from reaching the detector. The definition of the region of interest may be performed using simulations, actual measurements, and the like.

The small region of interest provides an accurate and highly sensitive optical measurement system that may be used to evaluate different samples, and/or to evaluate different areas of such samples including but not limited to dense arrays of structural elements, regions that exhibit potentially strained elements, regions that exhibit steep slopes and/or substantial height changes, peripheral areas, measuring through silicon vias, gate oxide of dynamic memory, three dimensional NAND memory units, post CMP areas of dynamic memories, and the like.

Due to the compactness of the region of interest, even a minor misalignment between the region of interest and the impinging beam may cause the system to block some, most and even all of the impinging beam.

The impinging beam may be regarded as being aligned with the region of interest when a center of the impinging beam is within the region of interest—especially when the center of the impinging beam is located at the middle of the region of interest.

The misalignment may result from system inaccuracies, temperature changes, vibrations, and the like.

Given the fact that the Raman spectrum is formed from relatively weak signals, the effect of the misalignment may be very significant.

Accordingly—the system, the method and the non-transitory computer readable medium are configured to compensate for such misalignment.

The compensation may involve optically aligning (or substantially optically aligning) the region of interest and the impinging beam. This may be done by controlling the location of an impingement of the impinging beam on the spatial filter.

The controlling may involve introducing a change in an optical collection path such as changing a direction of propagation of the impinging beam.

The compensation may be based on feedback related to the radiation detected by the detector. The feedback may be provided during a calibration process or during any other point in time.

The calibration process may be executed continuously, in a non-continuous manner, on the fly, in an iterative manner, and the like.

The calibration process may be based on an intensity of radiation detected by the detector (after passing through the spatial filter).

The calibration process may be based on information other than (or in addition to) the intensity of the radiation detected by the sensor.

The calibration process may be based on a Raman Spectrum sensed by the detector.

For simplicity of explanation, some of the following examples refer to an iterative process in which a calibration process is followed by a measurement process. The sample is measured during the measurement process.

During a calibration process a target is illuminated using different illumination path configurations that direct the collected radiation to different locations on the spatial filter to provide different test results.

One of the test results is selected (for example the test result having the highest overall intensity) and the illumination path configuration that provided the selected test result may be used during one or more measurement processes that follow the calibration process. Alternatively—multiple test results may be selected and an illumination path configuration that is a function (for example—a weighted average) of the multiple test results may be selected When executing multiple iterations of calibration processes there is a timing gap between consecutive calibration processes. Timing gaps between consecutive calibration processes may be fixed or may vary over time.

A calibration process may be triggered based on an event such as measurement failures, a detection of errors in one or more Raman spectra, a detection of certain temperature changes, a detection of certain temperatures, a detection of certain vibrations, occurrence of deviations of one or more measured Raman spectra from expected Raman spectra, and the like.

When the illumination path of a system includes different radiation sources then the calibration process may be executed per each radiation source or per some of the radiation sources. Such a calibration process may compensate for mechanical and/or optical misalignments related to the different radiation sources and may enable to use less accurate illumination and/or collection paths—which may simplify the system and even may reduce the cost of the system.

FIG. 1 illustrates an example of an illumination spot 20, an intensity distribution 21 of an aligned impinging beam, an intensity distribution 22 of a misaligned impinging beam and a region of interest 225.

In FIG. 1 it is assumed that the illuminating spot 20 is imaged onto the spatial filter.

FIG. 1 illustrates the difference in intensity (29) resulting from misalignment between the region of interest 225 and the impinging beam.

FIG. 1 also illustrates a portion of sample 300, and an image 225' of the region of interest on the sample.

Figure 2:
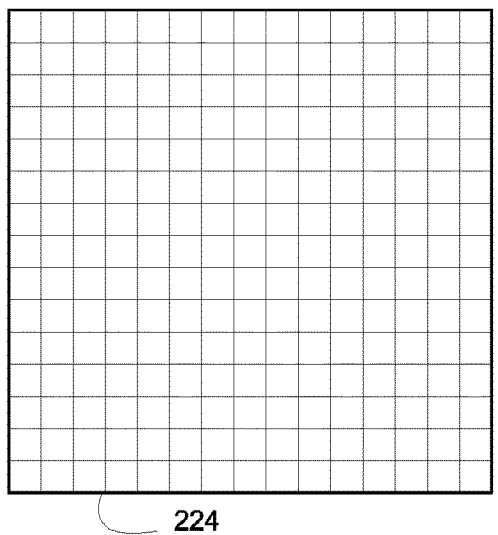
FIG. 2 illustrates a sensor, a spatial filter, a region of interest, and an impinging spot.
Figure 2:
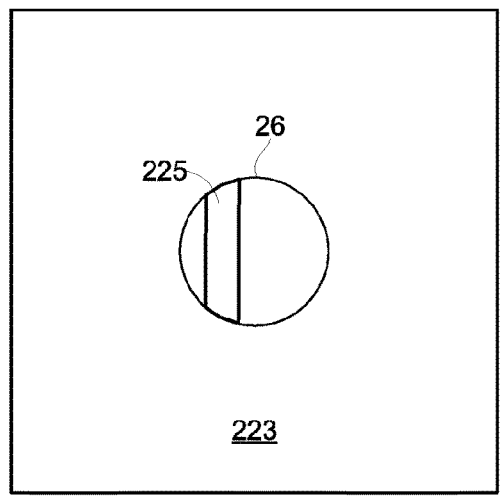
Figure 2:
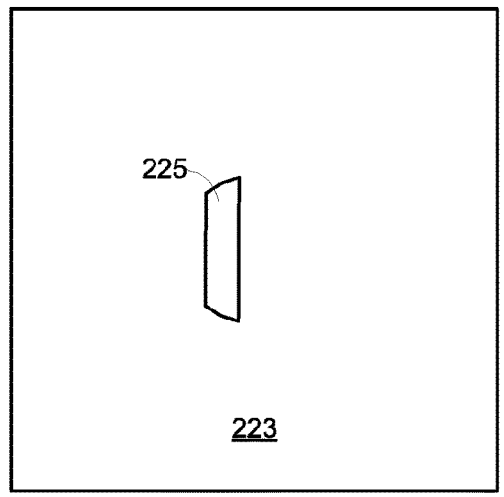

FIG. 2 illustrates a sensor 224, a spatial filter 223, a region of interest 225, and an impinging spot 26 formed by the impinging beam on the spatial filter.

The region of interest 225 is variable in size and can be much smaller than the impinging spot.

Figure 3:
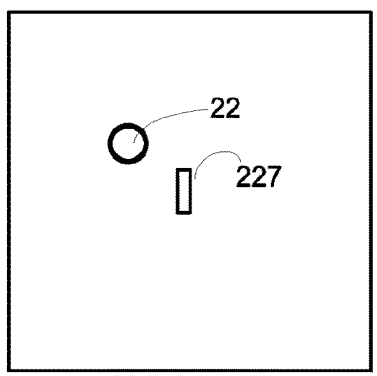
FIG. 3 illustrates nine spatial relationships between a region of interest.
Figure 3:
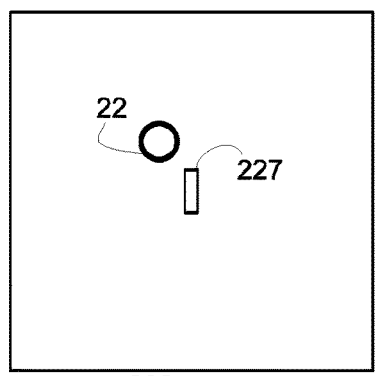
Figure 3:
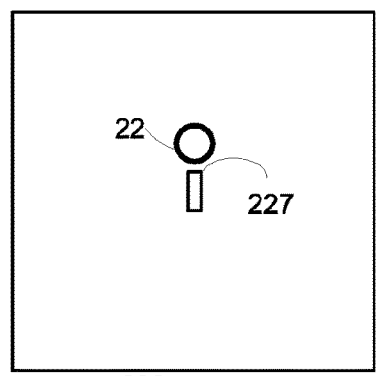
Figure 3:
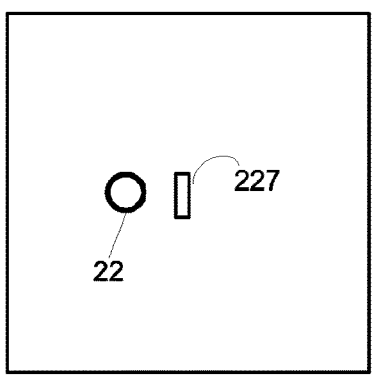
Figure 3:
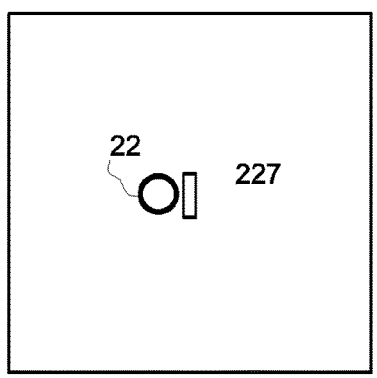
Figure 3:
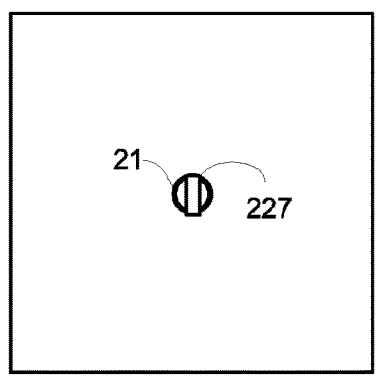
Figure 3:
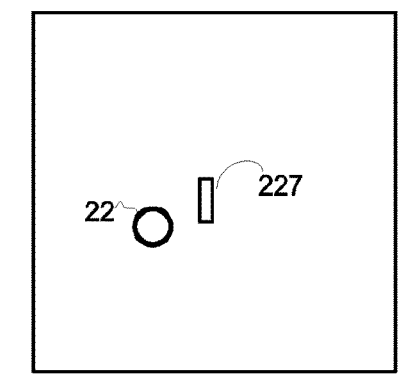
Figure 3:
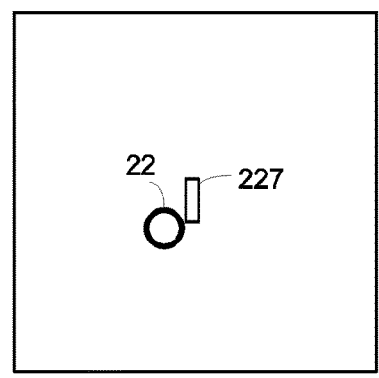
Figure 3:
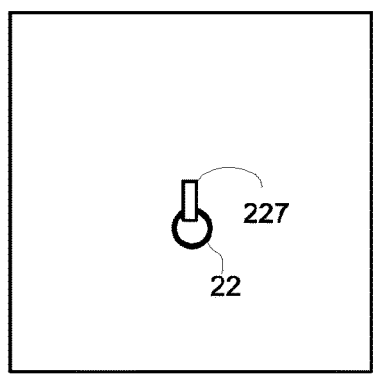

FIG. 3 illustrates nine spatial relationships 291-299 between the region of interest 227 and the impinging spot 26 at nine different configurations of the optical measurement system. The sixth configuration provides the best overlap—and thus it may be selected as the desired configuration of the optical measurement system to be applied during the next measurement processes.

It should be noted that during the compensation process the spatial filter may allow radiation to pass through a test region of interest that may be larger than the region of interest used during the measurement process.

Figure 4:
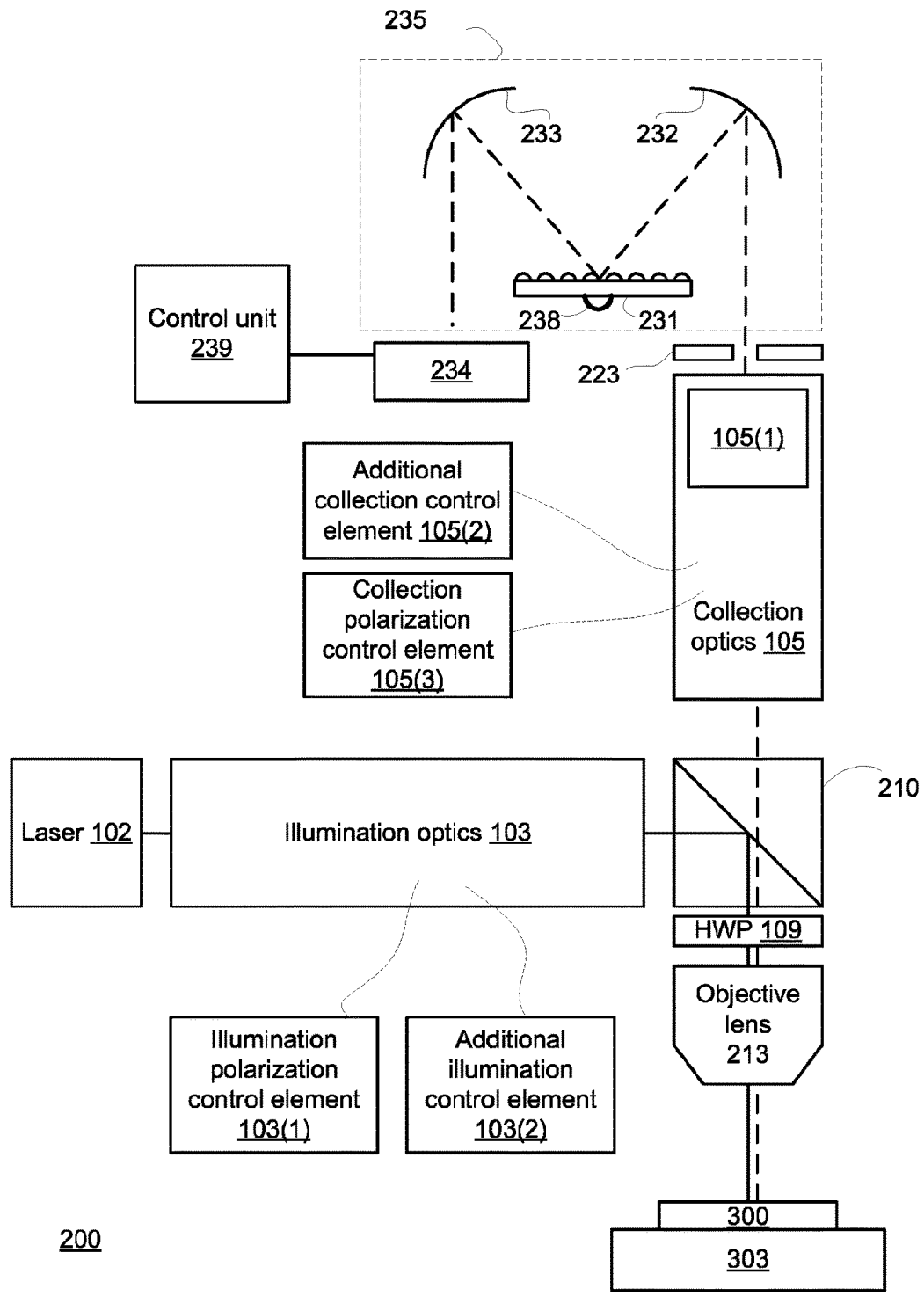
FIG. 4 is an example of an optical measurement system.

FIG. 4 is an example of an optical measurement system 200.

Optical measurement unit 200 includes an illumination path, a collection path, a control unit and a mechanical movement unit 303 for supporting sample 300 and for moving the sample 300 in relation to the collection and illumination paths. It should be noted that the sample 300 may be static while the illumination and/or collection paths may move. It should be noted that both the sample 300 and at least one path of the collection and/or illumination may move in relation to each other.

In FIG. 4 the collection path and the illumination path share an objective lens 213, and a half wavelength plate (HWP) 109. It should be noted that the illumination path and the collection path may share more components, may share other components, or may not share any component.

In FIG. 4 the illumination angle and the collection angle are perpendicular to the sample. It should be noted that any other illumination angles and/or collection angles may be provided.

The illumination path is configured to control various parameters of an illumination beam such as but not limited to polarization, frequency spectrum, shape, size, coherency, path, intensity, and the like. Various elements illustrated in the figure assist in the control of said parameters. Elements that control polarizations are referred as polarization control elements. Elements that control other parameters of the beam are referred to as additional control elements. It should be noted that a single element may control one or more parameters of the beam. Non-limiting examples of elements include polarizers, half waveplates, quarter waveplates, analyzers, lenses, grids, apertures, and the like.

The collection path is configured to control various parameters of the impinging beam such as but not limited to polarization, frequency spectrum, shape, size, coherency, path, intensity, and the like. Various elements illustrated in the figure assist in the control of said parameters.

The illumination path is illustrated as including (a) laser 102, (b) illumination optics 103 that include illumination polarization control element 103(1) and additional illumination control element 103(2), (c) a beam splitter such as dichroic beam splitter 210, (d) HWP 209, and (e) objective lens 213. The additional illumination control element may control one or more parameters that differ from polarization—for example shape, size, angle of propagation, and the like.

The collection path is illustrated as including (a) a beam splitter such as dichroic beam splitter 210, (b) HWP 209, (c) objective lens 213, (d) collection optics 105 that include adjustable optics 105(1) for changing the collection path thereby compensating for misalignments, additional collection control element 105(2), and collection polarization control element 105(3), (e) spatial filter 223, and (f) optical unit 235 that includes a grid 231, first lens 232 for directing radiation that passed through the region of interest onto the grid 231, second lens for directing light from grid 231 towards detector 224.

The optical unit 235 is configurable in the sense that the spatial relationship between the grid 231 and at least the second lens 233 may be altered to direct different radiation lobes from the grid 231 towards the second lens 233. FIG. 4 illustrates a rotating unit 238 that may rotate the grid 231 in relation to the first and second lenses. Movements other than rotations may be used to change the spatial relationship between the elements of optical unit 235.

Detector 224 is configured to generate Raman spectra. The detector 224 is coupled to control unit 225 that is configured to control various components/units/elements of the optical measurement system and may be configured to control the calibration process.

Figure 5:
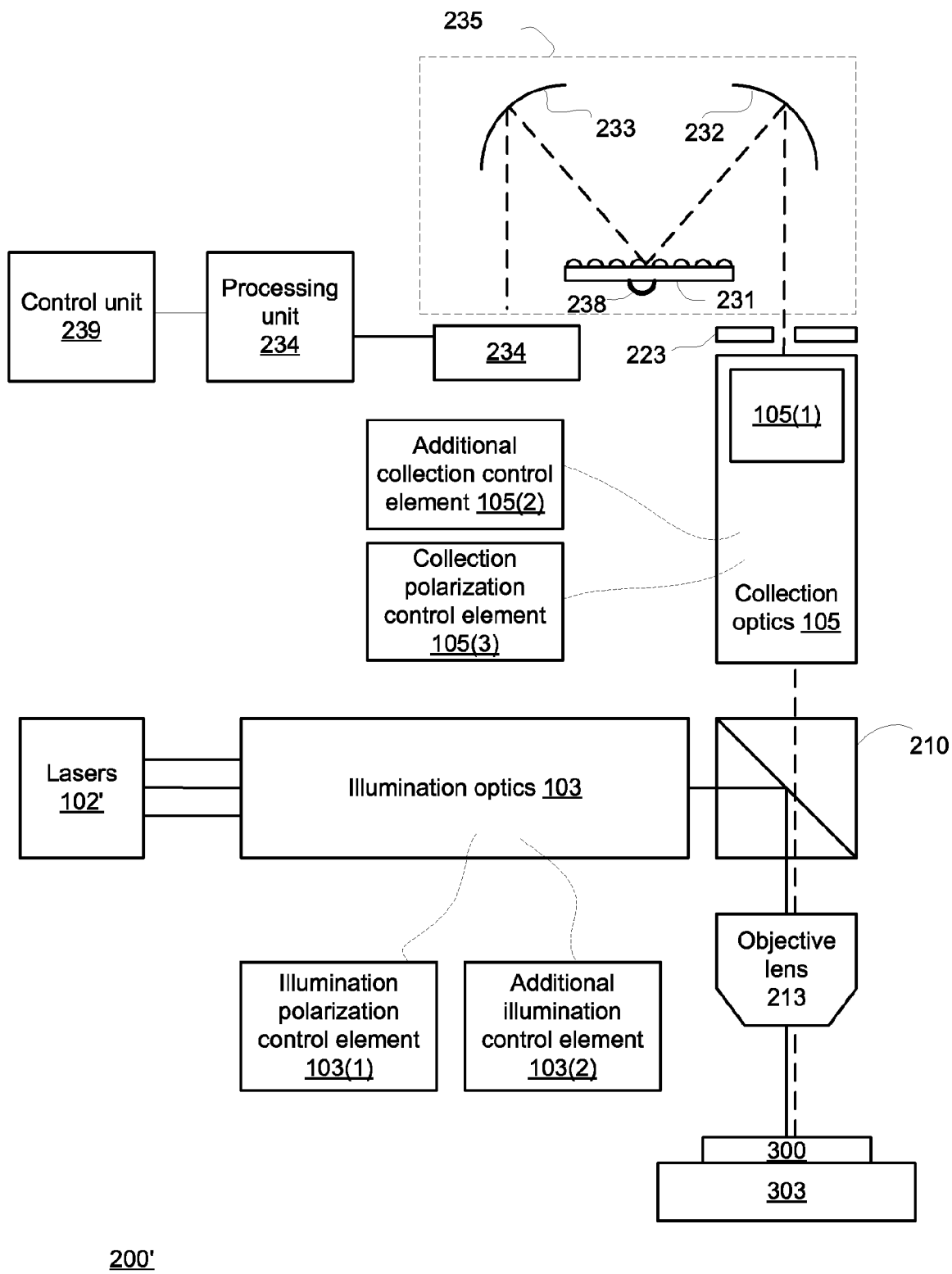
FIG. 5 is an example of an optical measurement system.

FIG. 5 is an example of an optical measurement system 200'.

Measurement system 200' differs from measurement unit 200 by (a) not including HWP 209, (b) including multiple lasers 102', and (c) including a processing unit 234 for processing detection signals. The illumination optics 103 may be configured to combine or select radiation from the multiple lasers. In some cases only one laser may be activated at a time.

Figure 6:
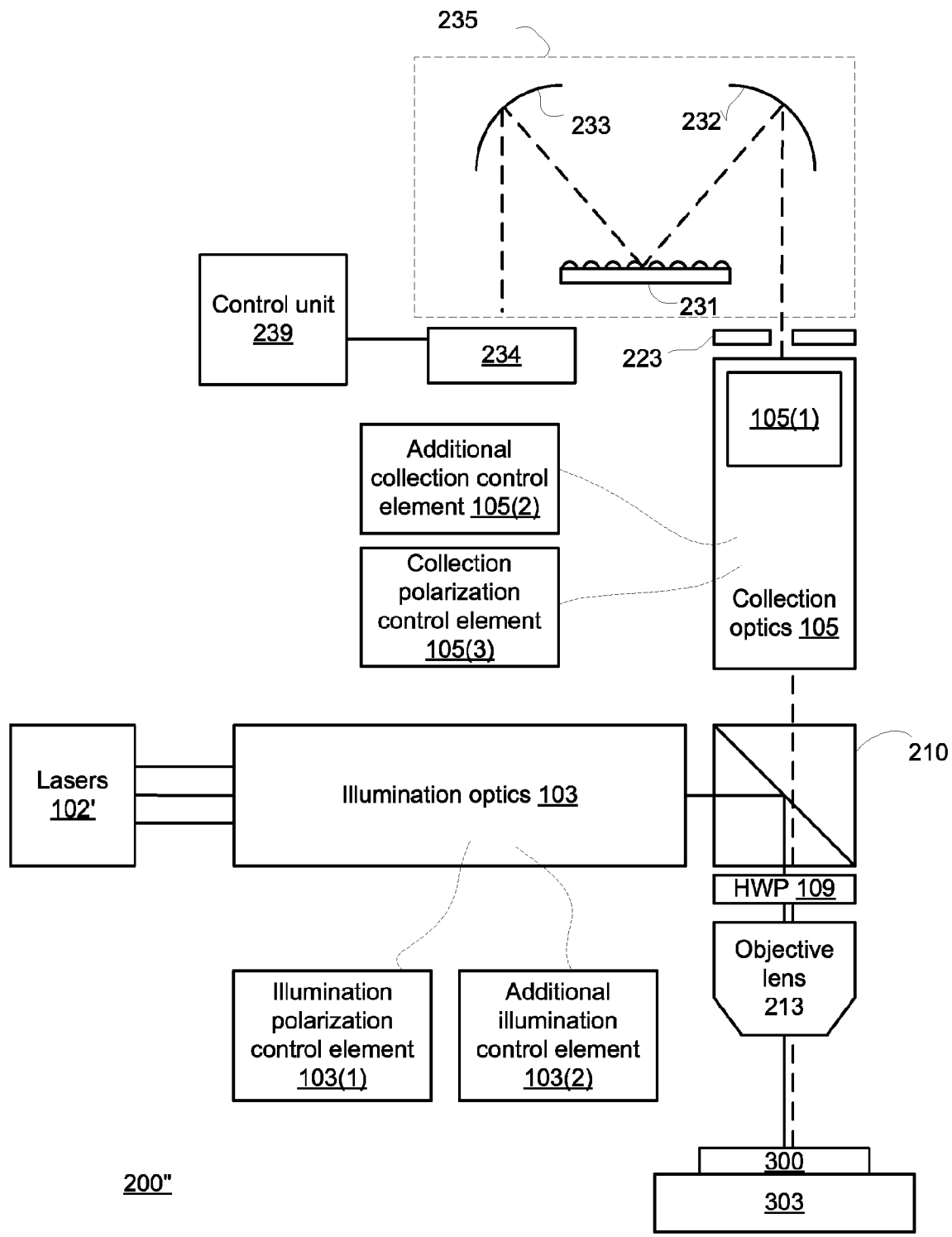
FIG. 6 is an example of an optical measurement system.

FIG. 6 is an example of an optical measurement system 200".

Measurement system 200" differs from measurement unit 200 by (a) not including HWP 209, and (b) including multiple lasers 102'. The illumination optics 103 may be configured to combine or select radiation from the multiple lasers. In some cases only one laser may be activated at a time.

Figure 7:
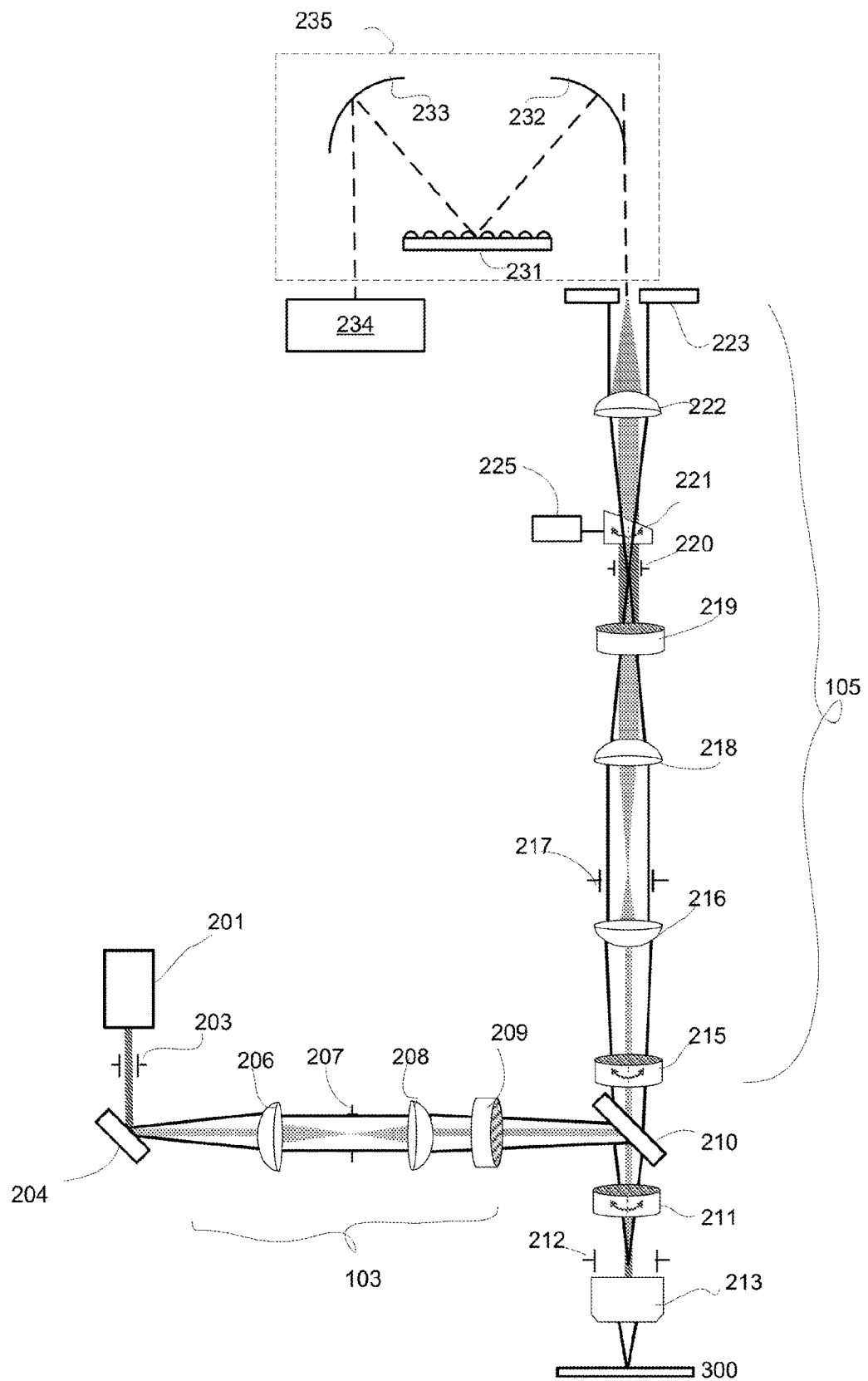
FIG. 7 is an example of an optical measurement system.

FIG. 7 illustrates an example of an optical measurement system 201.

System 201 includes an illumination path that includes laser 201, entrance aperture stop 203, mirror 204, first illumination lens 206, illumination field stop 207, second illumination lens 208, illumination polarizer 209, beam splitter 210, HWP such as a rotating HWP 211, objective aperture stop/back focal plane 212, and objective lens 213.

The collection path includes objective lens 213, objective aperture stop/back focal plane 212, sample 300, rotating collection polarizer 215, HWP such as a rotating HWP 211, first collection lens 216, collection aperture stop 217, second collection lens 218, Notch Filter 219, collection field stop 220, rotating wedge prism 221, wedge prism rotator 225, slit lens 222, spatial filter 223 (may be a slit that can be opened or closed, the size and/or shape of the open slit may be fixed or adjustable), optical unit 235, and detector 234.

Detector 234 may be a spectrograph.

Figure 8:
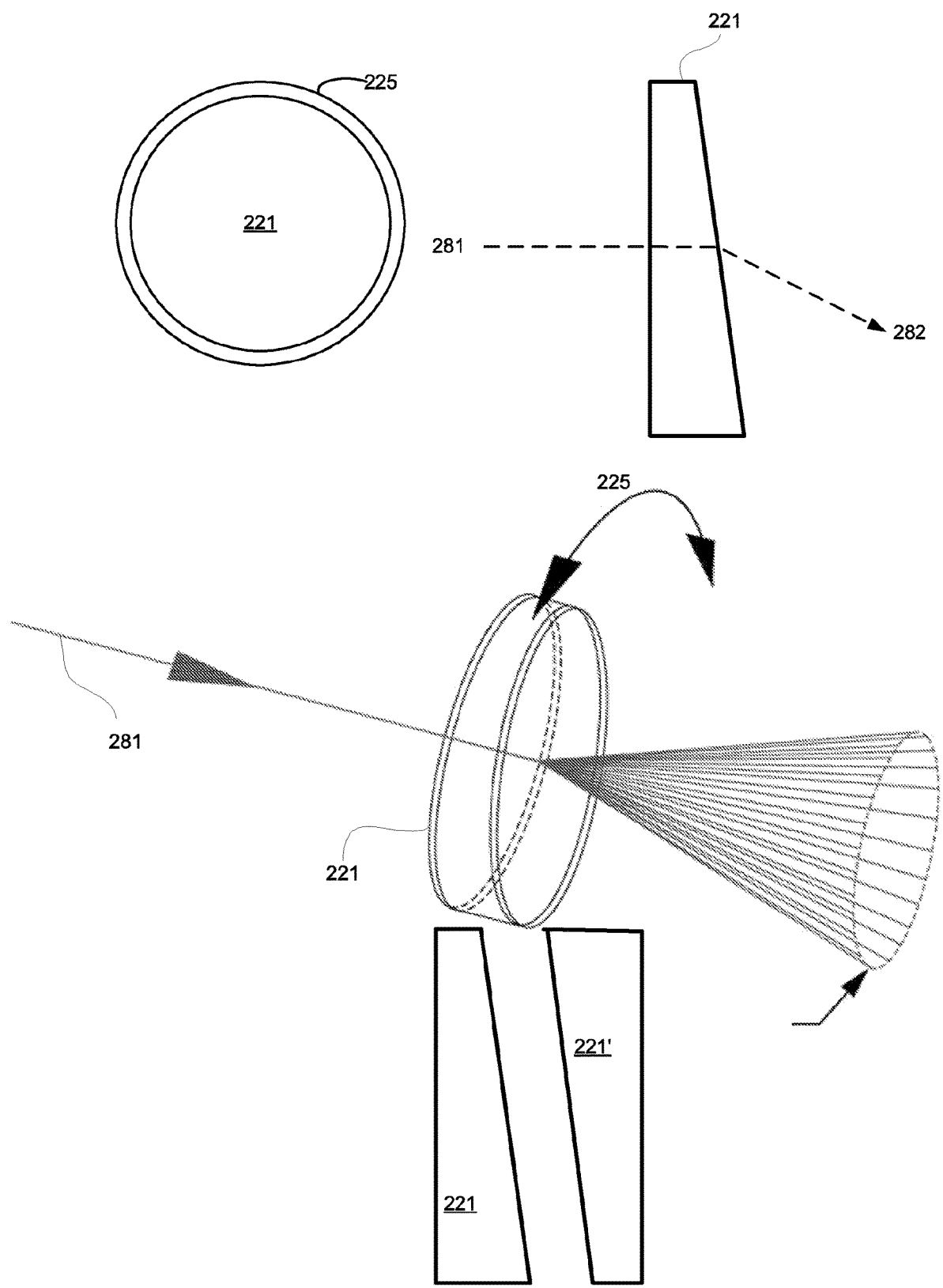
FIG. 8 illustrates examples of one or more rotating wedge prisms, and a wedge prism rotator.

FIG. 8 illustrates rotating wedge prism 221, wedge prism rotator 225 that surrounds the rotating wedge prism 221, an input beam 281 that enters the rotating wedge prism 221 and an output beam 282 outputted from the rotating wedge prism 221.

FIG. 8 also illustrates multiple paths of an output beam given different rotational locations of the rotating wedge prism 221.

FIG. 8 also illustrates that the system may include a pair of rotating wedge prisms 221 and 221' that provide more options to direct the output beam. The output beam passes through both rotating prisms.

Figure 9:
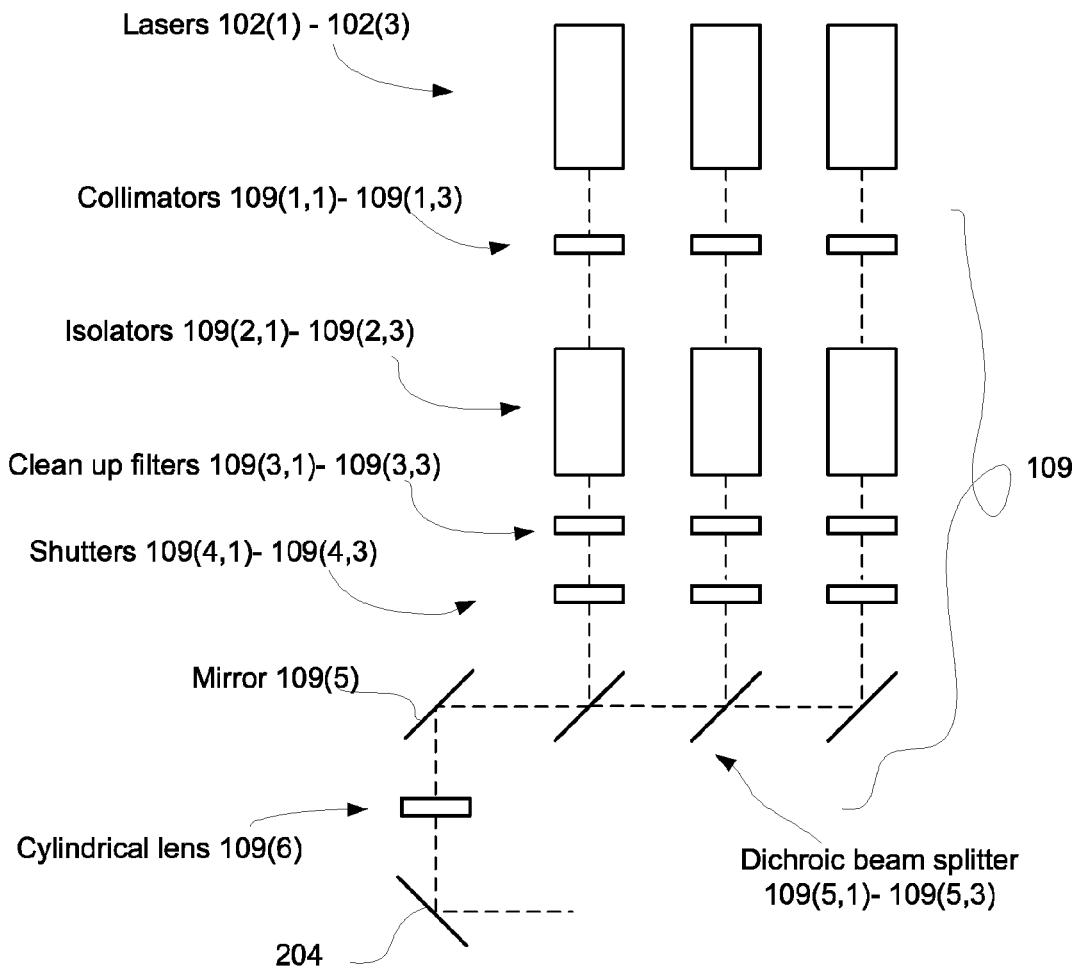
FIG. 9 illustrates an example of some elements of the illumination optics.

FIG. 9 illustrates an example of some elements of the illumination optics. There are three lasers followed by three sections of the illumination path that end by an optical adder for adding radiation from the three lasers.

The three lasers (for example red, blue and green lasers) 102(1)-102(3) are followed by the three sections of the illumination path. The three sections of the illumination path include three collimators 109(1,1)-109(1,3), three isolators 109(2,1)-109(2,3), three clean up filters 109(3,1)-109(3,3), and three shutters 109(4,1)-109(4,3).

The three sections are followed by a combiner that includes three beam splitters such as dichroic beam splitters 109(5,1)-109(5,3), the combiner is followed by initial mirror 109(5), cylindrical lens 109(6) and secondary mirror 204.

Figure 10:
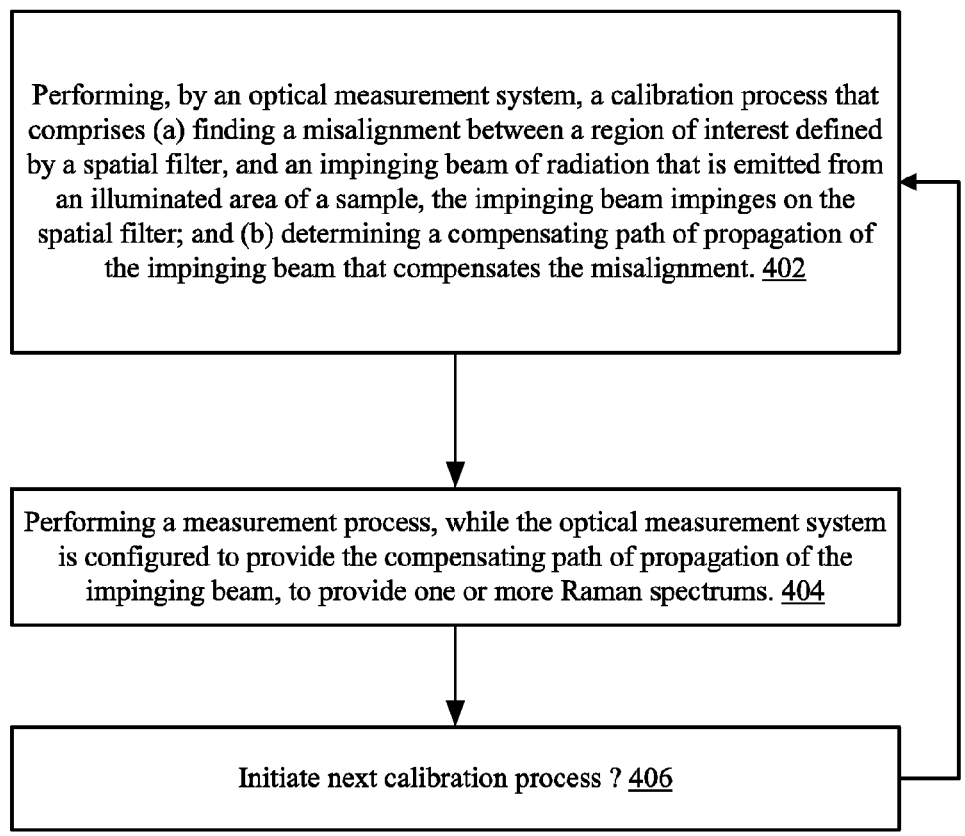
FIG. 10 illustrates an example of a method.

FIG. 10 illustrates an example of a method 400.

Method 400 may start by step 402 of performing, by an optical measurement system, a calibration process that may include (a) finding a misalignment between a region of interest defined by a spatial filter, and an impinging beam of radiation that is emitted from an illuminated area of a sample, the impinging beam impinges on the spatial filter; and (b) determining a compensating path of propagation of the impinging beam that compensates the misalignment.

The region of interest is shaped and sized to block scattered radiation from the illuminated area from reaching the detector.

Step 402 may include analyzing at least one Raman spectrum. Additionally or alternatively—step 402 may include analyzing radiation at frequencies that differ from frequencies of a Raman spectrum. The difference between the two examples of step 402 may involve rotating a grid located in the collection path.

Step 402 may be followed by step 404 of performing a measurement process, while the optical measurement system is configured to provide the compensating path of propagation of the impinging beam, to provide one or more Raman spectrums.

Step 404 may be followed by step 406 of determining whether to initiate a next iteration of steps 402 and 404—and if so—jumping to step 402.

Figure 11:
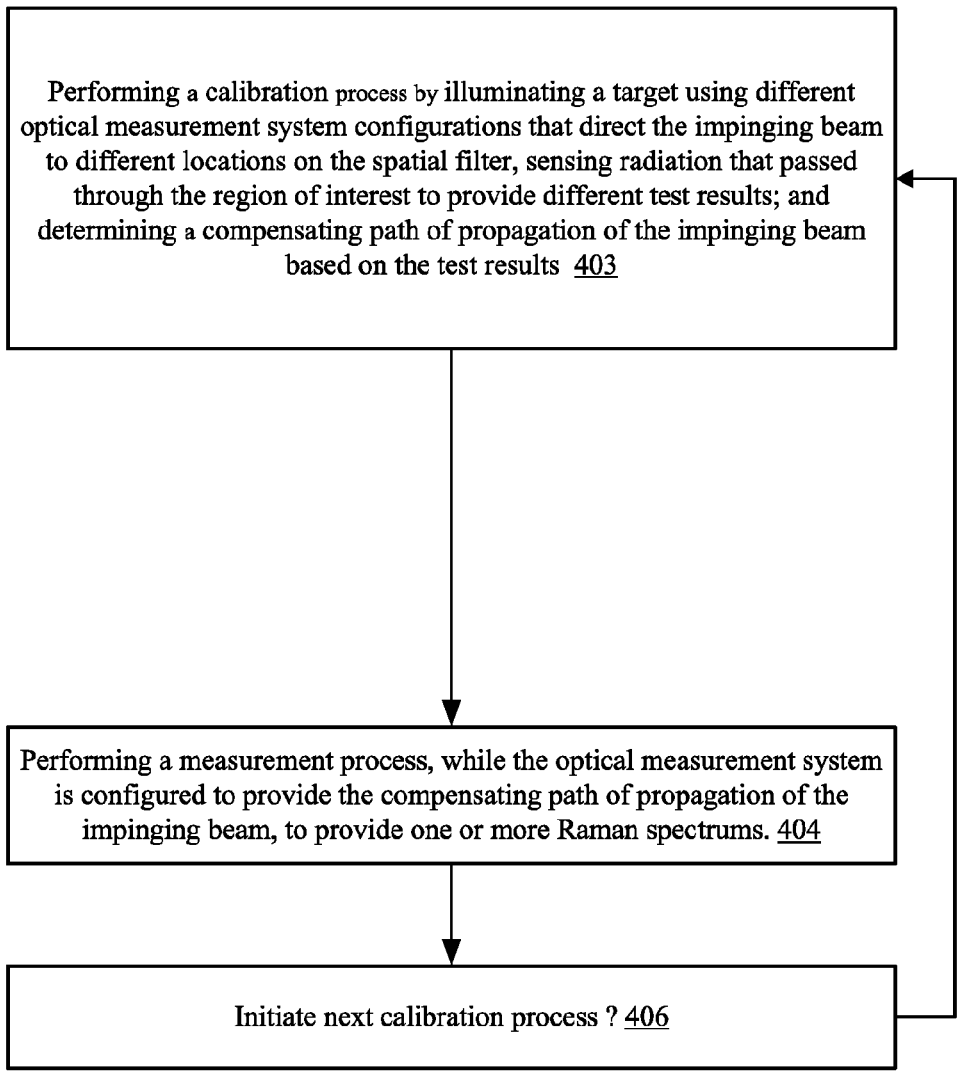
FIG. 11 illustrates an example of a method.

FIG. 11 illustrates an example of a method 401.

Method 401 may start by step 403 of performing a calibration process by illuminating a target using different optical measurement system configurations that direct the impinging beam to different locations on the spatial filter, sensing radiation that passed through the region of interest to provide different test results; and determining a compensating path of propagation of the impinging beam based on the test results.

The region of interest may be shaped and sized to block scattered radiation from the illuminated area from reaching the detector.

Step 403 may include selecting one of the test results to provide a selected test result, and determining the compensating path of propagation of the impinging beam based on the selected test result.

Step 403 may include selecting a test result of a highest intensity of the test results to provide the selected test result.

Is should be noted that the determining may include determining the compensation path by selecting multiple selected test results and defining the path based on the multiple selected test results—for example, using interpolation, extrapolation or any other method.

Step 403 may include rotating a wedge prism of the optical measurement system to find an orientation of the wedge prism that once applied will direct the impinging beam through the compensating path of propagation of the impinging beam.

Step 403 may include rotating multiple wedge prisms of the optical measurement system to find a combination of orientations of the multiple wedge prisms that once applied will direct the impinging beam through the compensating path of propagation of the impinging beam.

Step 403 may include analyzing at least one Raman spectrum. Additionally or alternatively—step 403 may include analyzing radiation at frequencies that differ from frequencies of a Raman spectrum. The difference between the two examples of step 404 may involve rotating a grid located in the collection path.

Step 403 may be followed by step 404 of performing a measurement process, while the optical measurement system is configured to provide the compensating path of propagation of the impinging beam, to provide one or more Raman spectrums.

Step 404 may be followed by step 406 of determining whether to initiate a next iteration of steps 402 and 404—and if so—jumping to step 402.

Figure 12:
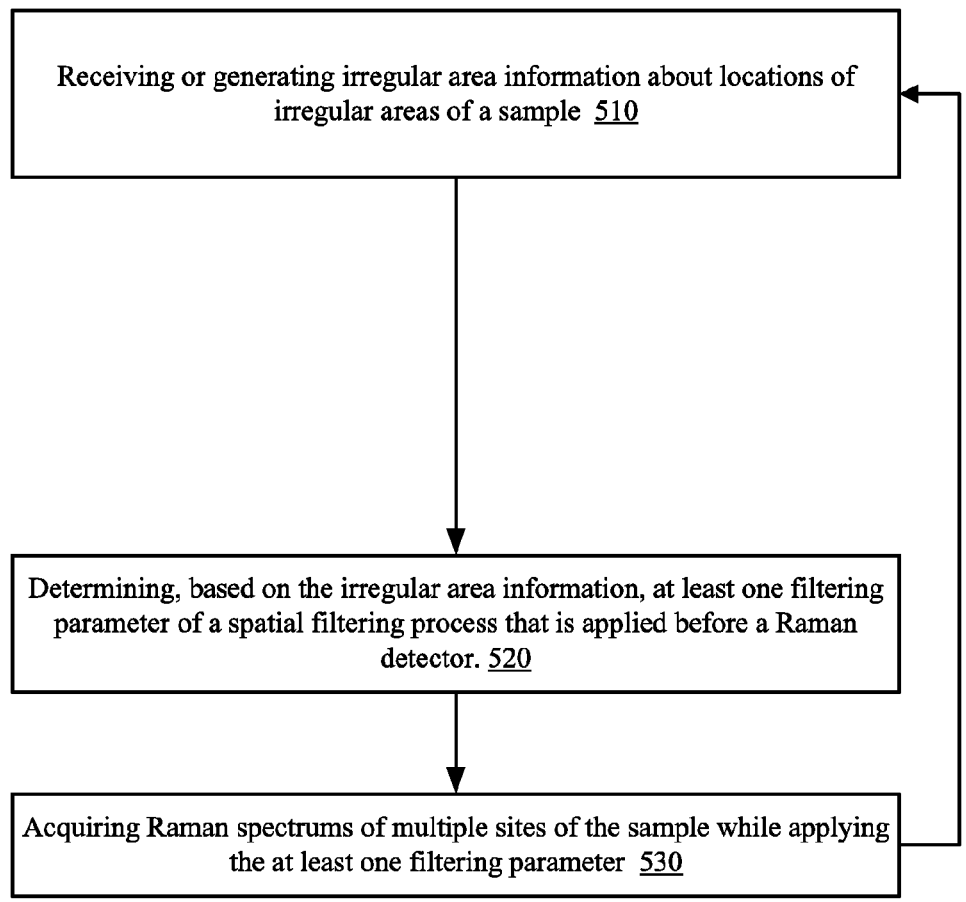
FIG. 12 illustrates an example of a method.

FIG. 12 illustrates method 500 for selective Raman spectroscopy.

Method 500 may include step 510 of receiving or generating irregular area information about locations of irregular areas of a sample.

Step 510 may be followed by step 520 of determining, based on the irregular area information, at least one filtering parameter of a spatial filtering process that is applied before a Raman detector.

Step 520 may include determining a spatial configuration of a filter that precedes the Raman detector.

Step 520 may include selecting a filter (or adjusting slit opening/width) that precedes the Raman detector out of multiple filters that differ from each other by at least one of the at least one filtering parameter.

The at least one filtering parameter may include an amount of light that reaches to the Raman detector, wherein the amount of light that reaches the Raman detector when illuminating an irregular area is lower than the amount of light that reaches the Raman detector when illuminating a regular area.

The at least one filtering parameter may include an area of an opening formed in a filter that precedes the Raman detector, wherein the area of the opening formed in the filter when illuminating an irregular area is smaller than the area of the opening formed in the filter when illuminating a regular area.

The at least one filtering parameter may include a shape of an opening formed in a filter that precedes the Raman detector, wherein the opening formed in the filter when illuminating an irregular area is narrower than the opening formed in the filter when illuminating a regular area.

When (a) an image, formed on a filter that precedes the Raman detector, of a regular element of a regular area, is narrower than (b) an image, formed on the filter, of an irregular element of an irregular area, then setting a width of an opening that is formed in the filter to be thinner than a width of the image of the irregular element.

Step 520 may include setting the width of the opening to exceed the width of the image of the irregular element.

Step 520 may be followed by step 530 of acquiring Raman spectrums of multiple sites of the sample while applying the filtering parameters.

Step 530 may include applying at least one filtering parameter that fits an irregular area when illuminating an irregular area and applying at least one filtering parameter that fits a regular area when illuminating a regular area.

There may be provided a method that includes receiving or determining filtering parameters and applying at least one filtering parameter that fits an irregular area when illuminating an irregular area and applying at least one filtering parameter that fits a regular area when illuminating a regular area.

Figure 13:
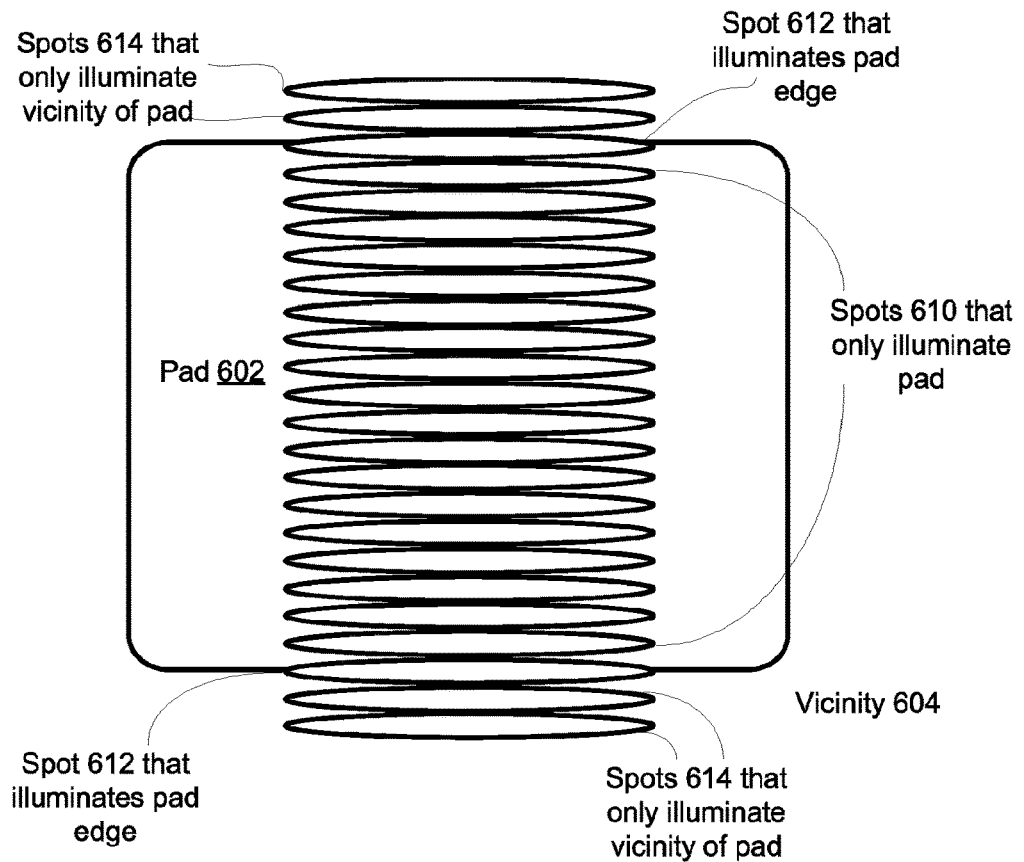
FIG. 13 illustrates an example of an illumination of a pad.
Figure 13:
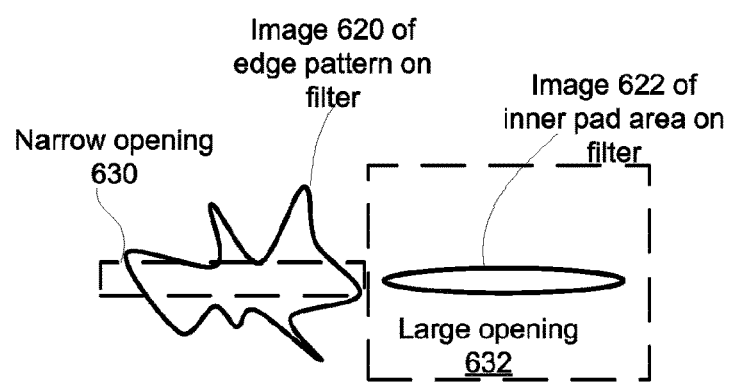

FIG. 13 illustrates an example of an illumination of a pad 602 and of a vicinity 604 of a pad.

Pad 602 and its vicinity 604 are illuminated by a scanning beam of radiation that form elliptical spots. Spots 614 illuminate only the vicinity and spots 610 illuminate only the pad. Spots 610 and 614 illuminate regular areas and at least one filtering parameter related to a regular area is applied during the collection.

Spots 612 illuminate the edge of the pad—and fall on both the pad and its vicinity. Spots illuminate irregular areas and at least one filtering parameter related to an irregular area is applied during the collection.

FIG. 13 also illustrates an image 622 of spots 610 on a filter that has a large opening 632 (at least one filtering parameter related to a regular area).

FIG. 13 further illustrates image 620 of spots 612 on a filter that has a narrow opening 630 (at least one filtering parameter related to an irregular area).

The narrow opening 630 may be narrower than image 620 but may be wider (or about equal) image 622.

Figure 14:
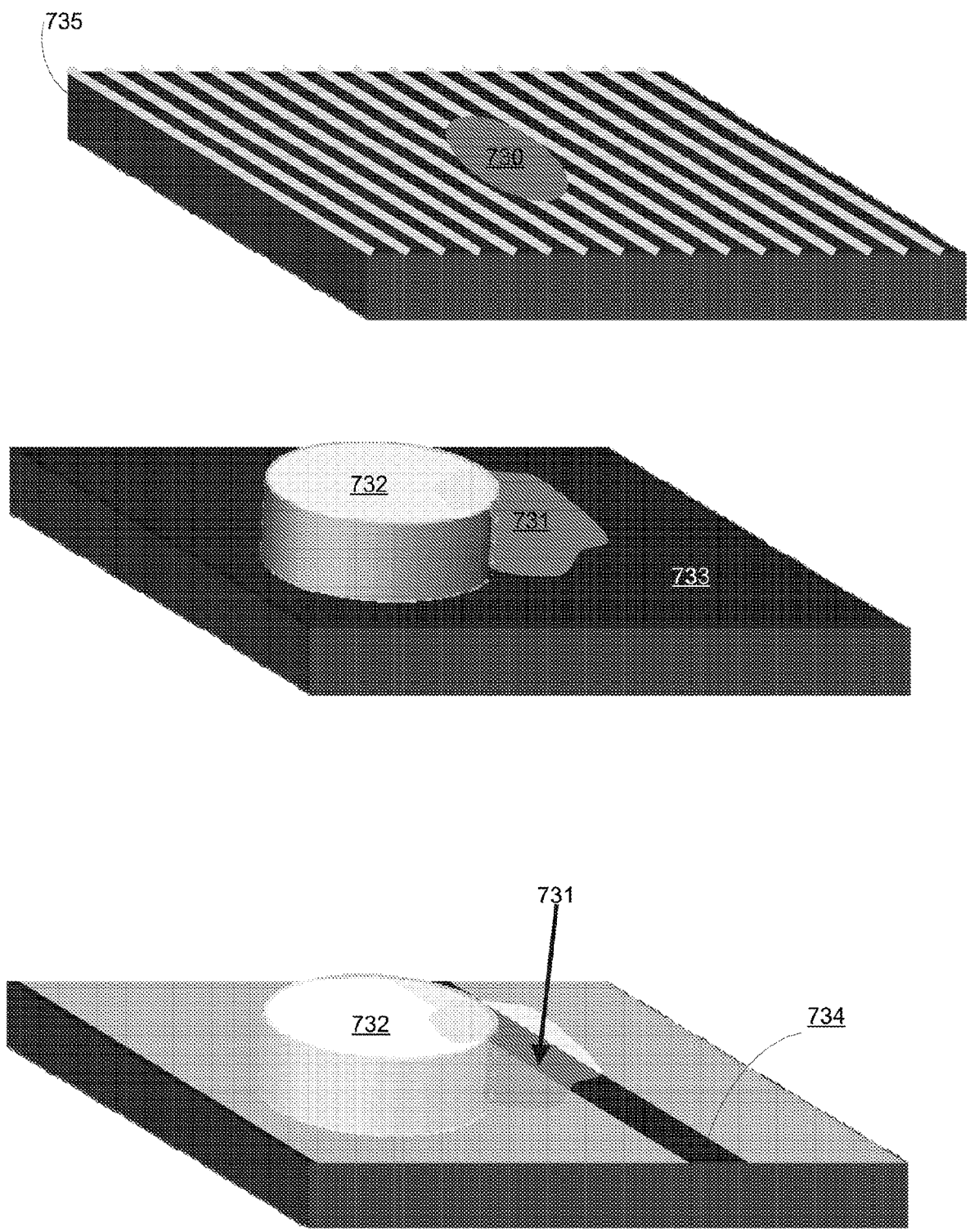
FIG. 14 illustrates an example of an illumination of regular and irregular areas.

FIG. 14 illustrates an example of an illumination of regular and irregular areas.

Spot 730 is not warped when illuminating regular area 730.

Step 731 is warped when illuminating irregular areas such as an edge region of via 732 and its vicinity 733, or illuminating a vicinity of a via that includes a slit 734.

It should be noted that the analysis of radiation and/or a generating of a Raman spectrum from detection signals of a detector and/or an analysis of a Raman spectrum to determine features of the objects may be executed, at least in part, by a controller and/or a processing circuit that does not belong to the optical measurement system and/or may be remotely positioned from the illumination and/or collection paths.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including", "comprising", "having", "consisting" and "consisting essentially of" are used in an interchangeable manner. For example—any method may include at least the steps included in the figures and/or in the specification, only the steps included in the figures and/or the specification.

We claim:

1. A method for accurate Raman spectroscopy, the method comprises:
   executing at least one iteration of:
   performing, by an optical measurement system, a calibration process that comprises (a) finding a misalignment between a region of interest defined by a spatial filter, and an impinging beam of radiation that is emitted from an illuminated area of a sample, the impinging beam impinges on the spatial filter; and (b) determining a compensating path of propagation of the impinging beam that compensates the misalignment; and
   performing a measurement process, while the optical measurement system is configured to provide the compensating path of propagation of the impinging beam, to provide one or more Raman spectra.

2. The method according to claim 1 wherein the performing of the calibration process comprises finding the misalignment by analyzing at least one Raman spectrum.

3. The method according to claim 1 wherein the performing of the calibration process comprises finding the misalignment by analyzing radiation at frequencies that differ from frequencies of a Raman spectrum.

4. The method according to claim 1 wherein the performing of the calibration process comprises illuminating a target using different optical measurement system configurations that direct the impinging beam to different locations on the spatial filter, sensing radiation that passed through the region of interest to provide different test results; and wherein the determining of the compensating path of propagation of the impinging beam based on the test results.

5. The method according to claim 4 wherein the determining of the compensating path comprises selecting one of the test results to provide a selected test result, and wherein the determining the compensating path of propagation of the impinging beam is based on the selected test result.

6. The method according to claim 5 comprising selecting a test result of a highest intensity of the test results to provide the selected test result.

7. The method according to claim 1 wherein the region of interest is shaped and sized to block scattered radiation from the illuminated area from reaching the detector.

8. The method according to claim 1 comprising rotating a wedge prism of the optical measurement system to find an orientation of the wedge prism that once applied will direct the impinging beam through the compensating path of propagation of the impinging beam.

9. The method according to claim 1 comprising rotating multiple wedge prisms of the optical measurement system to find a combination of orientations of the multiple wedge prisms that once applied will direct the impinging beam through the compensating path of propagation of the impinging beam.

10. An optical measurement system that comprises:
    an illumination path that is configured to illuminate a sample;
    a collection path that comprises adjustable optics;
    a detector;
    a spatial filter positioned upstream to the detector;
    a controller that is configured to control at least the adjustable optics during at least one iteration of (i) a calibration process, and (b) a measurement process;
    wherein during the calibration process the optical measurement system is configured to (a) find a misalignment between a region of interest defined by a spatial filter, and an impinging beam of radiation that is emitted from an illuminated area of the sample, the impinging beam impinges on the spatial filter; (b) determine a compensating path of propagation of the impinging beam that compensates the misalignment;
    wherein during the measurement process, the adjustable optical is maintained in a configured that provides the compensating path of propagation of the impinging beam, and the optical measurement system is configured to provide one or more Raman spectra.

11. The optical measurement system according to claim 10 that is configured to find the misalignment by analyzing at least one Raman spectrum.

12. The optical measurement system according to claim 10 that is configured to find the misalignment by analyzing radiation at frequencies that differ from frequencies of a Raman spectrum.

13. The optical measurement system according to claim 10 wherein during different points of time of the calibration process the adjustable optics is configured in different manners that cause the adjustable optics to direct the impinging beam to different locations on the spatial filter, wherein the detector is configured to sense radiation that passed through the region of interest to provide different test results; and wherein the controller is configured to determine the compensating path of propagation of the impinging beam based on the test results.

14. The optical measurement system according to claim 13 wherein the controller is configured to select one of the test results to provide a selected test result, and determine the compensating path of propagation of the impinging beam based on the selected test result.

15. The optical measurement system according to claim 14 wherein the controller is configured to select a test result of a highest intensity of the test results to provide the selected test result.

16. The optical measurement system according to claim 10 wherein the region of interest is shaped and sized to block scattered radiation from the illuminated area from reaching the detector.

17. The optical measurement system according to claim 10 wherein the adjustable optics comprises a wedge prism, wherein the controller is configured to control a rotation of the wedge prism to find an orientation of the wedge prism that once applied will direct the impinging beam through the compensating path of propagation of the impinging beam.

18. The optical measurement system according to claim 10 wherein the adjustable optics comprises multiple wedge prisms, wherein the controller is configured to control a rotation of the multiple wedge prisms to find a combination of orientations of the multiple wedge prisms that once applied will direct the impinging beam through the compensating path of propagation of the impinging beam.

19. The optical system according to claim 10, wherein the optics are configured to apply at least one filtering parameter that fits an irregular area when illuminating an irregular area and apply at least one filtering parameter that fits a regular area when illuminating a regular area.

20. A non-transitory computer readable medium that stores instructions for performing at least one iteration of:
 performing, by an optical measurement system, a calibration process that comprises (a) finding a misalignment between a region of interest defined by a spatial filter, and an impinging beam of radiation that is emitted from an illuminated area of a sample, the impinging beam impinges on the spatial filter; and (b) determining a compensating path of propagation of the impinging beam that compensates the misalignment; and
 performing a measurement process, while the optical measurement system is configured to provide the compensating path of propagation of the impinging beam, to provide one or more Raman spectra.

21. The non-transitory computer readable medium according to claim 20 wherein the performing of the calibration comprises illuminating a target using different optical measurement system configurations that direct the impinging beam to different locations on the spatial filter, sensing radiation that passed through the region of interest to provide different test results; and determining the compensating path of propagation of the impinging beam based on the test results.

22. A method for selective Raman spectroscopy, the method comprises:
 receiving or generating irregular area information about locations of irregular areas of a sample;
 determining, based on the irregular area information, at least one filtering parameter of a spatial filtering process that is applied before a Raman detector; and
 acquiring Raman spectrums of multiple sites of the sample while applying the at least one filtering parameter.

23. The method according to claim 22 wherein the determining of the at least one filtering parameter comprises a spatial configuration of a filter that precedes the Raman detector.

24. The method according to claim 23 wherein the determining of the at least one filtering parameter comprises selecting a filter that precedes the Raman detector out of multiple filters that differ from each other by at least one of the at least one filtering parameter.

25. The method according to claim 22 wherein the at least one filtering parameter comprises an amount of light that reaches to the Raman detector, wherein the amount of light that reaches the Raman detector when illuminating an irregular area is lower than the amount of light that reaches the Raman detector when illuminating a regular area.

26. The method according to claim 22 wherein the at least one filtering parameter comprises an area of an opening formed in a filter that precedes the Raman detector, wherein the area of the opening formed in the filter when illuminating an irregular area is smaller than the area of the opening formed in the filter when illuminating a regular area.

27. The method according to claim 22 wherein the at least one filtering parameter comprises a shape of an opening formed in a filter that precedes the Raman detector, wherein the opening formed in the filter when illuminating an irregular area is narrower than the opening formed in the filter when illuminating a regular area.

28. The method according to claim 22 wherein (a) an image, formed on a filter that precedes the Raman detector, of a regular element of a regular area, is narrower than (b) an image, formed on the filter, of an irregular element of a irregular area, then setting a width of an opening that is formed in the filter to be thinner than a width of the image of the irregular element.

29. The method according to claim 28 comprising setting the width of the opening to exceed the width of the image of the irregular element.

30. A non-transitory computer readable medium that stores instructions for performing the steps of:
 receiving or generating irregular area information about locations of irregular areas of a sample;
 determining, based on the irregular area information, filtering parameters of a spatial filtering process that is applied before a Raman detector; and
 acquiring Raman spectrums of multiple sites of the sample while applying the at least one filtering parameter.

* * * * *